United States Patent
Vining et al.

(10) Patent No.: US 6,505,764 B2
(45) Date of Patent: Jan. 14, 2003

(54) CARRIER ASSEMBLY MOUNTABLE WITHIN A PICKUP TRUCK BED

(76) Inventors: Wesley H. Vining, 959 Ray Ct., Powell, WY (US) 82435-8115; James Shorb, 951 Ray Ct., Powell, WY (US) 82435

(*) Notice: Subject to any disclaimer, the term of this patent is extended or adjusted under 35 U.S.C. 154(b) by 0 days.

(21) Appl. No.: 09/729,501

(22) Filed: Dec. 5, 2000

(65) Prior Publication Data

US 2002/0066761 A1 Jun. 6, 2002

(51) Int. Cl.[7] ................................................ B60R 7/00
(52) U.S. Cl. ................ 224/405; 224/403; 224/549; 224/551; 248/228.5; 248/352; 248/354.1; 248/503; 410/143; 414/462
(58) Field of Search ................... 224/403, 405, 224/549, 550, 551; 248/228.5, 231.61, 352, 354.1, 503; 410/143, 151, 152; 414/462

(56) References Cited

U.S. PATENT DOCUMENTS

| | | | | |
|---|---|---|---|---|
| 3,110,506 A | * | 11/1963 | O'Brien | 211/105.6 |
| 3,336,642 A | * | 8/1967 | Armacost | 24/523 |
| 4,343,578 A | * | 8/1982 | Barnes | 410/143 |
| 4,737,056 A | * | 4/1988 | Hunt | 224/404 |
| 4,744,471 A | * | 5/1988 | Leister | 160/330 |
| 4,934,572 A | | 6/1990 | Bowman et al. | |
| 5,007,568 A | | 4/1991 | Da Vault | |
| 5,092,504 A | | 3/1992 | Hannes et al. | |
| 5,118,156 A | | 6/1992 | Richard | |
| 5,127,546 A | * | 7/1992 | Romero | 224/403 |
| 5,127,564 A | | 7/1992 | Romero | |
| 5,443,190 A | * | 8/1995 | Cucheran et al. | 224/309 |
| 5,472,301 A | * | 12/1995 | Wallen | 410/143 |
| 5,553,762 A | | 9/1996 | Brown | |
| 5,560,576 A | | 10/1996 | Cargill | |
| 5,813,647 A | * | 9/1998 | Chen | 248/354.1 |
| 6,059,159 A | * | 5/2000 | Fisher | 224/309 |

* cited by examiner

*Primary Examiner*—Stephen K. Cronin
(74) *Attorney, Agent, or Firm*—Donald W. Margolis; Emery L. Tracy

(57) ABSTRACT

A cargo carrier assembly for releasably securing cargo to a pickup truck is provided. The pickup truck has a bed and a pair of side rails extending above the bed with each rail having an inside surface and an outside surface. The cargo carrier assembly comprises a center bar member having a first end and a second end, a first bar member slidably receiving the first end of the center bar member, and a second bar member slidably receiving the second end of the center bar member. An attaching mechanism for releasably securing the first bar member to a first side rail of the pickup truck and for releasably securing the second bar member to a second side rail of the pickup truck. A cargo receiving mechanism is releasably securable to the first bar member for receiving predetermined cargo.

21 Claims, 5 Drawing Sheets

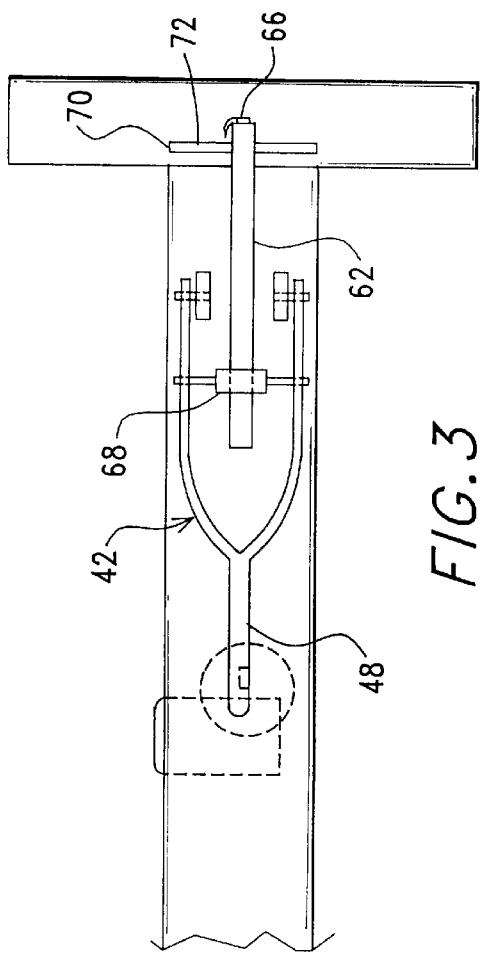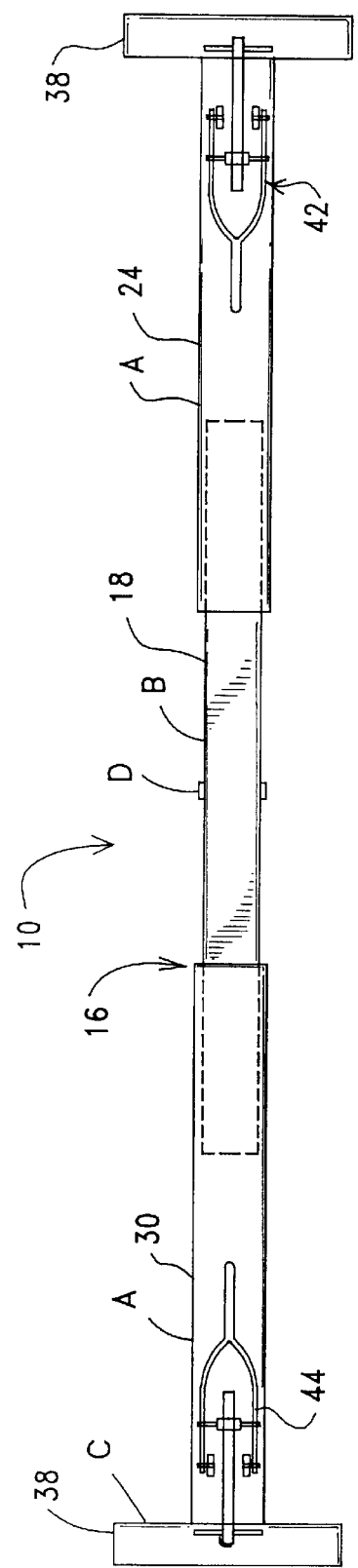

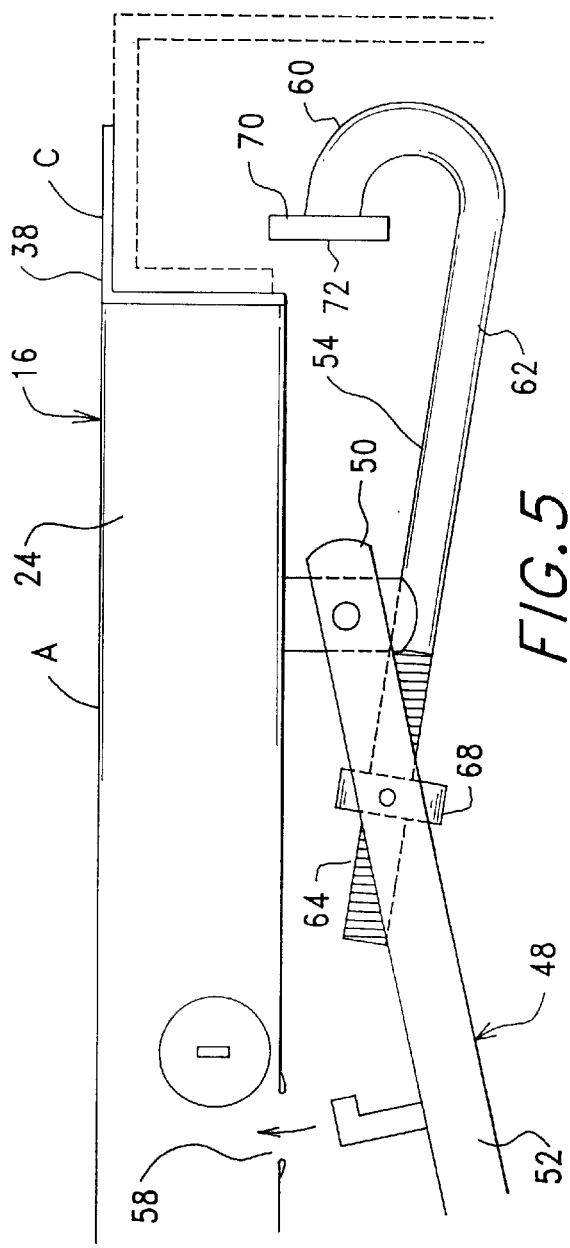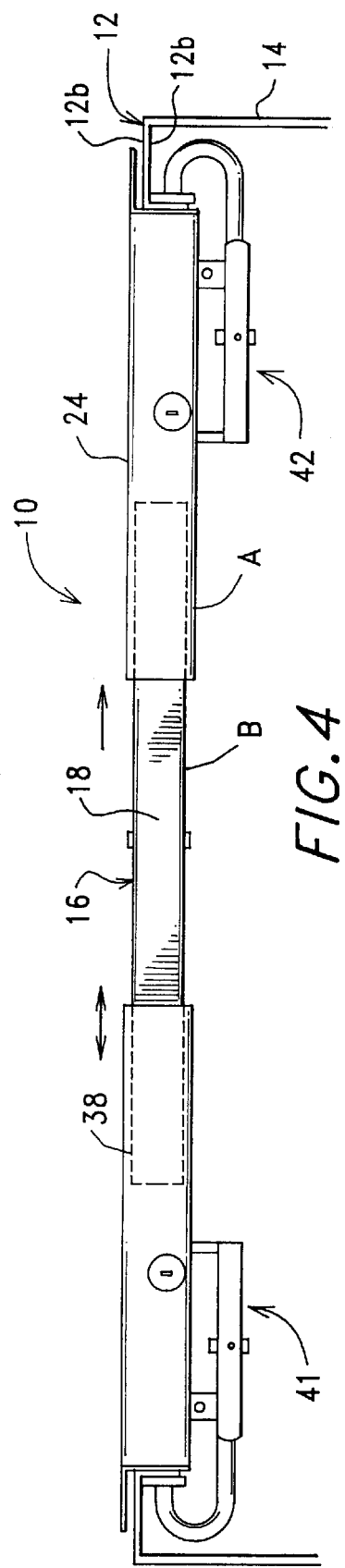

CARRIER ASSEMBLY MOUNTABLE WITHIN A PICKUP TRUCK BED

BACKGROUND OF THE INVENTION

1. Field of the Invention

This invention relates generally to a cargo carrier assembly mountable within a pickup truck bed, and, more particularly, it relates to a cargo carrier assembly which can be mounted within a bed of a pickup truck without altering or otherwise damaging the pickup truck for carrying sporting goods and the like.

2. Description of the Prior Art

A number of devices have been devised for transporting sporting goods, i.e., bicycles, skis, snowboards, etc., in the back of pickup trucks. Many of these devices have involved racks which can be installed in the backs of pickup trucks, extending across the entire beds of the trucks, which may be used to transport a number of sporting goods. Unfortunately, none of these devices provide the user with an inexpensive, easy-to-install device to carry these sporting goods. Furthermore, these devices have not provided the user with adequate security for either the device itself or the sporting goods stored therewith.

Accordingly, there exists a need for a cargo carrier assembly mountable within a pickup truck bed for carrying sporting goods and the like which is inexpensive to construct and easy to install. Additionally, a need exists for a cargo carrier assembly mountable within a pickup truck bed for carrying sporting goods and the like which promotes security by adequately securing the cargo carrier assembly to the pickup truck whereby inhibiting accidental and intentional removal of the cargo carrier assembly. Furthermore, there exists a need for a cargo carrier assembly mountable within a pickup truck bed for carrying sporting goods and the like which expands to fit any size pickup truck and does not require any modification to the pickup truck prior to installation.

SUMMARY OF THE INVENTION

The present invention is a cargo carrier assembly for releasably securing cargo to a pickup truck. The pickup truck has a bed and a pair of side rails extending above the bed with each rail having an inside surface and an outside surface. The cargo carrier assembly comprises a center bar member having a first end and a second end, a first bar member slidably receiving the first end of the center bar member, and a second bar member slidably receiving the second end of the center bar member. An attaching mechanism for releasably securing the first bar member to a first side rail of the pickup truck and for releasably securing the second bar member to a second side rail of the pickup truck. A cargo receiving mechanism is releasably securable to the first bar member for receiving predetermined cargo.

The present invention additionally includes a system for releasably securing cargo for transport in a pickup truck. The pickup truck has a bed and a pair of side rails extending above the bed with each rail having an inside surface and an outside surface. The system comprises an expandable frame extendable across the bed of the pick up and contactable with the outside surface of each of the side rails. A securing mechanism is pivotally connected to the expandable frame and tightenable against the inside surface of each of the side rails. A carrier assembly is slidable along the expandable frame for carrying predetermined cargo.

The present invention further includes a method for releasably securing cargo for transport in a pickup truck. The pickup truck has a bed and a pair of side rails extending above the bed with each rail having an inside surface and an outside surface. The method comprises extending an expandable frame across the bed of the pick up, contacting the outside surface of each of the side rails with the expandable frame, providing a securing mechanism, pivotally connecting the securing mechanism to the expandable frame, tightening the securing-mechanism against the inside surface of each of the side rails, providing a carrier assembly for carrying predetermined cargo, and slidably mounting the carrier assembly along the expandable frame.

BRIEF DESCRIPTION OF THE DRAWINGS

FIG. 2 is a bottom view illustrating the cargo carrier assembly of FIG. 1, constructed in accordance with the present invention, showing the mounting assembly for releasably securing the cargo carrier assembly to the pickup truck bed;

FIG. 3 is an enlarged bottom view illustrating the mounting assembly of the cargo carrier assembly of FIG. 2, constructed in accordance with the present invention;

FIG. 4 is a side elevational view illustrating the cargo carrier assembly of FIG. 1, constructed in accordance with the present invention, with the mounting assembly releasably securing the cargo carrier assembly to a pickup truck bed;

FIG. 5 is an enlarged elevational side view illustrating the mounting assembly of the cargo carrier assembly of FIG. 4, constructed in accordance with the present invention, with the mounting assembly opened to release the cargo carrier assembly from the pickup truck;

DETAILED DESCRIPTION OF THE PREFERRED EMBODIMENTS

Figure 1:
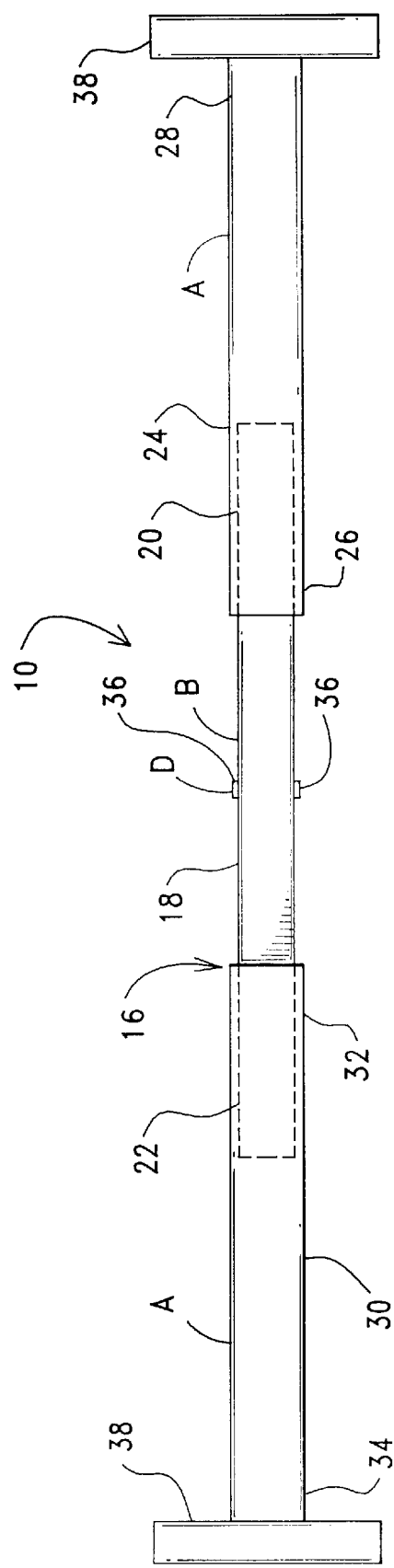
FIG. 1 is a top plan view illustrating a cargo carrier assembly mountable within a pickup truck bed for carrying sporting goods and the like, constructed in accordance with the present invention.

As illustrated in FIG. 1, the present invention is a cargo carrier assembly, indicated generally at 10, mountable to the side rails 12 of a pickup truck bed 14 above a pickup truck bed (not shown) for carrying sporting goods (not shown) and the like. Each of the side rails 12 of the pickup truck bed 14 includes an inside surface 12a and an outside surface 12b.

While for purposes of discussion, the sporting goods described heretofore and hereafter will be referred to as "skiing equipment", a person skilled in the art will understand that the cargo carrier 10 of the present invention can be used for any type of sporting goods. Furthermore, while the cargo carrier assembly 10 of the present invention is designed to carry sporting goods and the like, it is within the scope of the present invention to utilize the cargo carrier assembly 10 to carry a variety of goods including, but not limited to, construction equipment, logging equipment, etc.

The cargo carrier assembly 10 of the present invention includes a main frame system 16 for extending between the bed side rails 12 of the pickup truck 14. The main frame system 16 includes a center bar member 18 having a first end 20 and a second end 22, a hollow first frame member 24 having a first end 26 for receiving the first end 20 of the center bar member 18 and a second end 28 securable to the bed side rail 12 of the pickup truck 14, and a hollow second frame member 30 having a first end 32 for receiving the second end 22 of the center bar member 18 and a second end 34 securable to the bed side rail 12 of the pickup truck bed 14. A centering knob 36 can be secured to the center bar member 18 to limit the extent of the movement of the first frame member 24 and the second frame member 30 relative to the center bar member 18.

The first frame member 24 and the second frame member 30 include a support plate 38 secured to the second ends 28, 34 of the first frame member 24 and the second frame member, respectively, for supporting the cargo carrier assembly 10 above the pickup truck bed 14. The support 38 plates preferably have a substantially L-shaped cross-sectional configuration and rest against and upon the outside surface 12b of the bed side rail 12 of the pickup truck bed 14 thereby suspending the center bar member 18, the first frame member 24, and the second frame member 30 above the pickup truck bed 14. Preferably, the support plate 38 includes a resilient gasket 40 between the support plate 38 and the bed side rail 12 to inhibit marring or damage to the pickup truck bed 14.

Preferably, the main frame system 16 including the center frame member 18, the first frame member 24, and the second frame member 30 are constructed from a steel material. It is within the scope of the present invention, however, to construct the main frame system 16 from other materials including, but not limited to, aluminum, other durable metals, plastic, etc., and to construct the center frame member 18, the first frame member 24, and the second frame member 30 from different materials.

As illustrated in FIG. 2, the cargo carrier assembly 10 of the present invention includes a first tightening assembly 42 associated with the first frame member 24 and a second tightening assembly 44 associated with the second frame member 30. For purposes of discussion, the first tightening assembly 42 and the second tightening assembly 44 are identically constructed and when discussed together will be referred to simply as the tightening assembly 42, 44. It is within the scope of the present invention, however, to have the first tightening assembly 42 be constructed differently than the second tightening assembly 44.

As illustrated in FIGS. 3, 4, and 5, the tightening assembly 42, 44 of the cargo carrier assembly 10 of the present invention includes a yoke bracket 46 secured to the frame member 24, 30. Preferably, the yoke bracket 46 is secured to the frame member 24, 30 by welding although other methods of securing the yoke bracket 46 to the frame member 24, 30 are within the scope of the present invention.

The tightening assembly 42, 44 further includes a locking arm 48 having a first arm end 50 and a second arm end 52. The first arm end 48 of the locking arm 48 is pivotally mounted to the yoke bracket 46 by a rivet 54 or the like. The second arm end 52 of the locking arm 48 includes a lock tang device 56 for locking the frame member 24, 30 to the pickup truck bed 12. The lock tang device 56 is receivable within an aperture 58 formed in the frame member 24, 30. A locking mechanism 60 activated by a key (not shown), for instance, is mounted within the frame member 24, 30 to lock the cargo carrier assembly 10 relative to the pickup truck bed 12. Actual operation of the cargo carrier assembly 10 will be discussed in further detail below.

In addition, the tightening assembly 42, 44 of the cargo carrier assembly 10 of the present invention includes a securing arm 62 having a first end 64 and a second end 66. The securing arm 62 preferably has a substantially J-configuration. The first end 64 of the securing arm 62 is pivotally mounted to the locking arm 48 between the first arm end 50 and the second arm end 52. A pivoting nut 68 can be used to pivotally connect the securing arm 62 to the locking arm 48 although any type of mechanism can be used so long as the securing arm 62 freely pivots relative to the locking arm 48.

The second end 66 of the securing arm 62 includes a flattened portion 70 for contacting the inside surface 12a of the bed side rail 12 of the pickup truck bed 14. The flattened portion 70 of the securing arm 62 secures the cargo carrier assembly 10 to the bed side rails 12 of the pickup truck bed 14. A resilient gasket 72 can be applied to the flattened portion 70 to inhibit marring or damage to the pickup truck bed 14.

Figure 6:
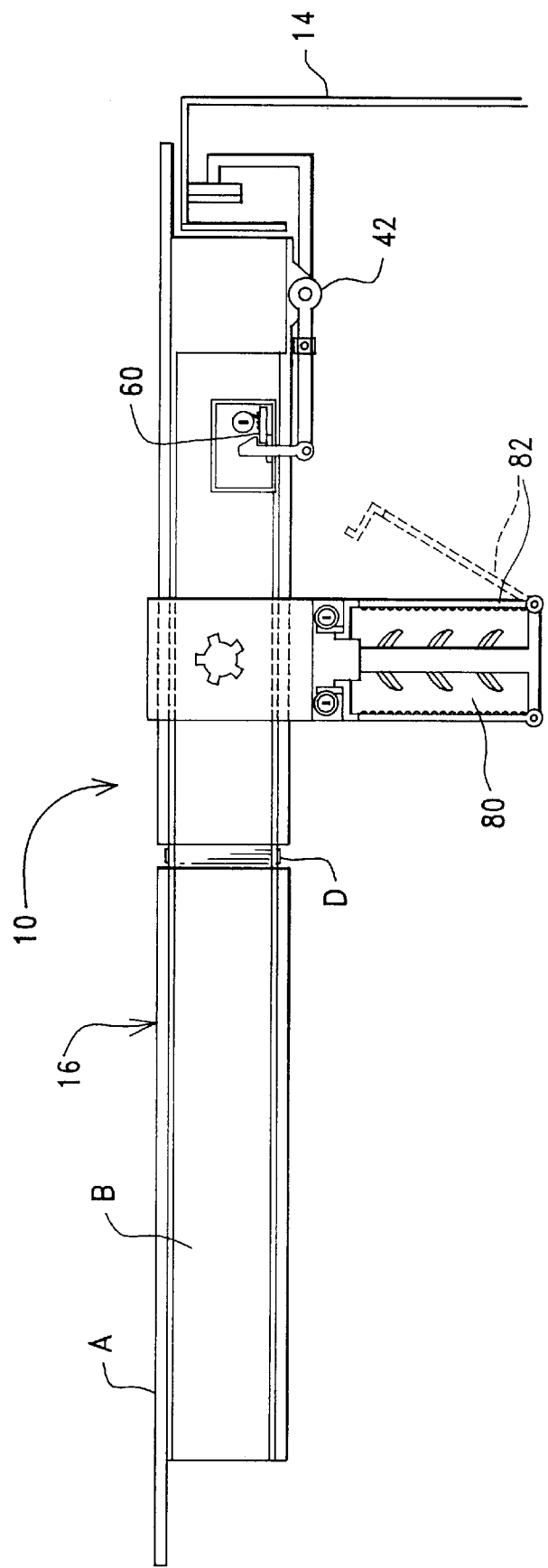
FIG. 6 is a side elevational side view illustrating the cargo carrier assembly, constructed in accordance with the present invention, with a ski rack attachment device releasably slidably attached to the cargo carrier assembly.
Figure 8:
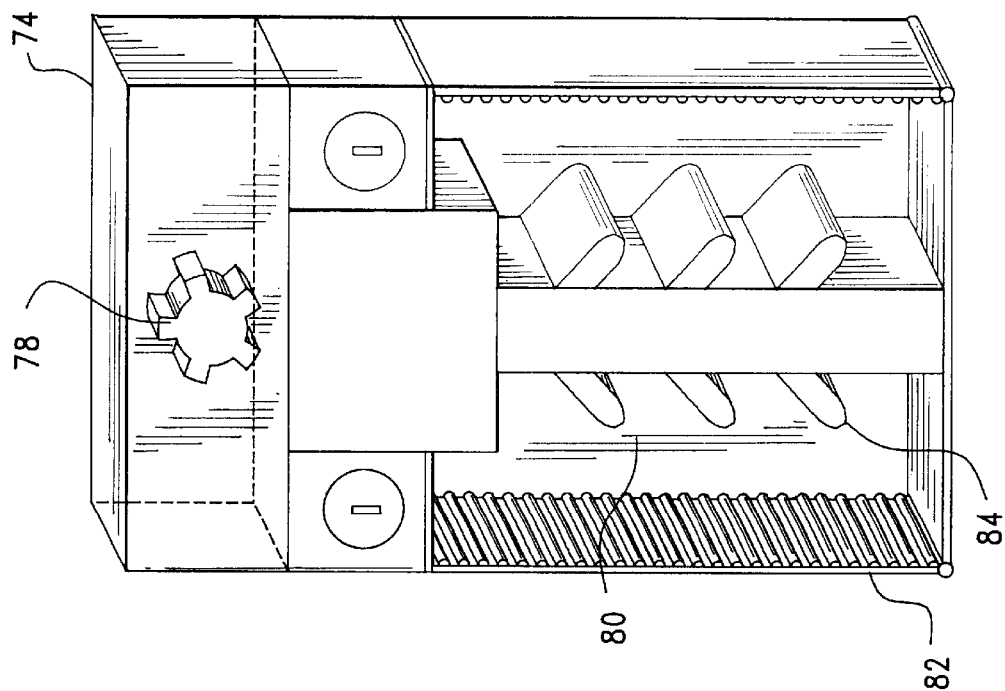
FIG. 8 is a perspective view illustrating the ski rack attachment device of FIGS. 6 and 7, constructed in accordance with the present invention.
Figure 7:
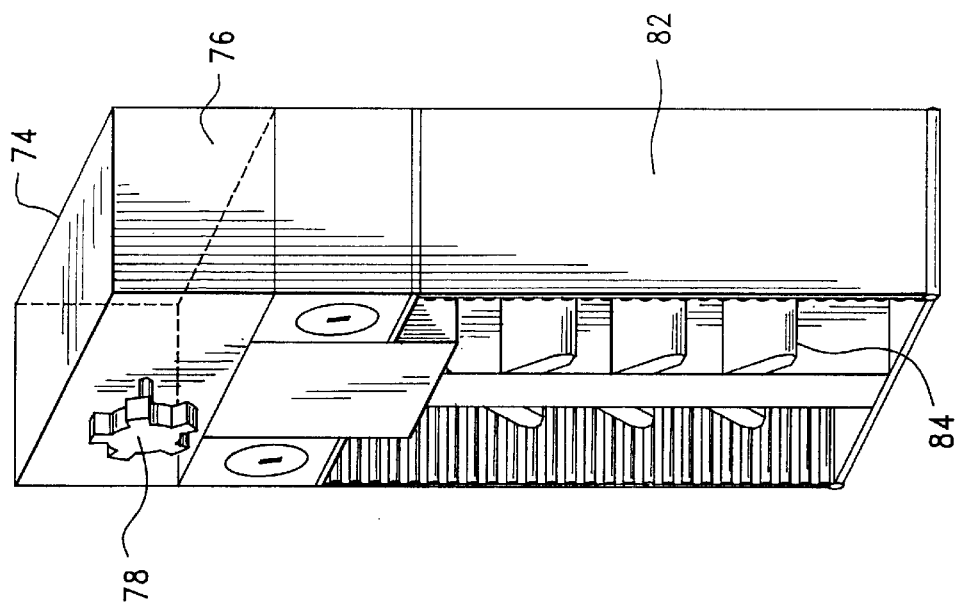
FIG. 7 is an enlarged perspective view illustrating the ski rack attachment device of FIG. 6, constructed in accordance with the present invention.

As illustrated in FIGS. 6, 7, and 8, the cargo carrier assembly 10 of the present invention includes a ski rack attachment device 74 for carrying skis and the like within the cargo carrier assembly 10. The ski rack attachment 74 device includes a channel 76 for receiving the center bar member 18, the first frame member 24, and the second frame member 30. A tightening bolt 78 can be included though the channel 76 to tighten against the center bar member 18, the first frame member 24, and/or the second frame member 30 to releasably maintain the ski rack attachment device 74 in position relative to the center bar member 18, the first frame member 24, and/or the second frame member 30.

The ski rack attachment device 74 further includes at least one pocket 80 for receiving the sporting goods product such as ski or the like. The pocket 80 includes a hinged door panel 82 openable to receive the sporting goods products and closeable to releasably retain the sporting goods products within the pocket 80. A plurality of compressible grips 84 are preferably mounted within the pocket 80 to further retain the sporting goods product therein.

The operation of the cargo carrier assembly 10 of the present invention will now be described. A person skilled in the art will understand that the description of the operation of the cargo carrier assembly 10 set forth below is only a preferred embodiment and that other operations are within the scope of the present invention.

First, in order to mount the cargo carrier assembly 10 to the pickup truck, the first frame member 24 and/or the second frame member 30 of the main frame system 16 are removed from the center frame member 18 of the main frame system 16. At least one ski rack attachment device 74 is positioned over the first frame member 24 and/or the second frame member 30 to slidably move along the main frame system 16. Depending on the number of sporting goods products, such as skis, intended and desired to be transported, any number of ski rack attachments 74 can be secured to the main frame system 16.

The first frame member 24 and/or the second frame member 30 are then mounted back onto the center bar member 18 and moved in a generally inward direction along the center bar member 18 toward the centering knob. The main frame system 16 is then positioned over the pickup truck bed 14 to be releasably mounted thereto.

Next, the first frame member 24 and the second frame member 30 are moved in a generally outward direction along the center bar member 18 away from the centering knob 36 until the support plates 38 are resting upon and against the outside surface 12b of the bed side rails 12. The tightening assemblies 42, 44 of both the first frame member 24 and the second frame member 30 are then manipulated until the second end 66 of the securing arm 62 is positioned against the inside surface 12a of the bed side rail 12. The locking arm 48 is then moved toward the frame member 24, 30 until the lock tang device 56 is received within the aperture 58 of the frame member 24, 30. The locking mechanism 60 is then activated to lock the main frame system 16 to the pickup truck bed 14.

While the cargo carrier assembly 10 has been described as being a singular unit, preferably, at least two cargo carrier assemblies 10 are utilized to maintain the cargo above the pickup truck bed 14. Of course, the actual number of cargo carrier assemblies 10 is determined by the user depending on the user's desires and intended use.

The cargo carrier assembly 10 of the present invention fits across the bed of any size pickup truck and securely locks into place to inhibit either intentional or unintentional removal of the cargo carrier assembly 10 therefrom. The cargo carrier assembly 10 is perfectly suited for snow skis, surfboards, and skiboards. Furthermore, the cargo carrier assembly 10 protects the integrity of the pickup truck and does not require additional holes to be drilled or other damage to be incurred.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

I claim:

1. A cargo carrier assembly for releasably securing cargo to a pickup truck, the pickup truck having a bed and a pair of side rails extending above the bed, each rail having an inside surface and an outside surface, the cargo carrier assembly comprising:
    a center bar member having a first end and a second end;
    a first bar member slidably receiving the first end of the center bar member;
    a second bar member slidably receiving the second end of the center bar member;
    attaching means for releasably securing the first bar member to a first side rail of the pickup truck and for releasably securing the second bar member to a second side rail of the pickup truck;
    a centering knob secured to said center bar member for limiting the inward extent of movement of said first bar member and the second bar member; and
    cargo receiving means releasably securable to the first bar member for receiving predetermined cargo.

2. The cargo carrier assembly of claim 1 and further comprising:
    securing means for releasably securing the cargo receiving means relative to the center bar member, the first bar member, and the second bar member.

3. The cargo carrier assembly of claim 1 wherein the cargo receiving means includes a frame, the frame having a channel slidable along the center bar member, the first bar member, and the second bar member.

4. The cargo carrier assembly of claim 3 and further comprising:
    a door panel hingedly connected to the frame.

5. The cargo carrier assembly of claim 4 and further comprising:
    a cargo locking mechanism for selectively locking the cargo within the frame.

6. The cargo carrier assembly of claim 1 wherein the first bar member contacts the outside surface of the first side rail and the second bar member contacts the outside surface of the second side rail.

7. The cargo carrier assembly of claim 6 and further comprising:
    a first rail plate contacting the outside surface of the first side rail; and
    a second rail plate contacting the outside surface of the second side rail.

8. The cargo carrier assembly of claim 7 and further comprising:
    a first resilient gasket secured to the first rail plate; and
    a second resilient gasket secured to the second rail plate.

9. The cargo carrier assembly of claim 6 wherein the attaching means has a first locking arm pivotally connected to the first bar member and a first securing arm pivotally connected to the first locking arm, the first locking arm movable toward the first bar member causing the first securing arm to contact the inside surface of the first side rail thereby releasably securing the first side rail between the first securing arm and the first bar member.

10. The cargo carrier assembly of claim 9 and further comprising:
    first locking means associated with the first locking arm and the second locking arm for selectively locking the first side rail between the first securing arm and the second bar member.

11. The cargo carrier assembly of claim 9 and further comprising:
    a first contacting plate secured to the first securing arm and contactable with the inside surface of the first side rail.

12. The cargo carrier assembly of claim 11 and further comprising:
    a first contacting resilient gasket secured to the first contacting plate.

13. The cargo carrier assembly of claim 9 wherein the attaching means has a second locking arm pivotally connected to the second bar member and a second securing arm pivotally connected to the second locking arm, the second locking arm movable toward the second bar member causing the second securing arm to contact the inside surface of the second side rail thereby releasably securing the second side rail between the second securing arm and the second bar member.

14. The cargo carrier assembly of claim 13 and further comprising:
    second locking means associated with the first locking arm and the second locking arm for selectively locking the first side rail between the first securing arm and the second bar member.

15. The cargo carrier assembly of claim 13 and further comprising:

a second contacting plate secured to the second securing arm and contactable with the inside surface of the second side rail.

16. The cargo carrier assembly of claim 15 and further comprising:

a second contacting resilient gasket secured to the second contacting plate.

17. A system for releasably securing cargo for transport in a pickup truck, the pickup truck having a bed and a pair of side rails extending above the bed, each rail having an inside surface and an outside surface, the system comprising:

an expandable frame extendable across the bed of the pick up and contactable with the outside surface of each of the side rails;

a securing mechanism pivotally connected to the expandable frame and tightenable against the inside surface of each of the side rails, said securing mechanism including a locking arm pivotally connected to said expandable frame and a securing arm pivotally connected to said locking arm, said locking arm movable toward the expandable frame causing said securing arm to contact the inside surface of each of the side rails, thereby releasably securing said side rail between the securing arm and the expandable frame; and a carrier assembly slidable along the expandable frame for carrying predetermined cargo.

18. The system of claim 17 and further comprising:

locking means associated with the securing mechanism for selectively locking each side rail between the securing mechanism and the expandable frame.

19. The system of claim 17 and further comprising:

securement means for releasably securing the carrier assembly relative to the frame member.

20. The system of claim 17 wherein the expandable frame includes a center bar member having a first end and a second end, a first bar member slidably receiving the first end of the center bar member, and a second bar member slidably receiving the second end of the center bar member.

21. The system of claim 20 wherein the first bar member contacts the outside surface of the first side rail and the second bar member contacts the outside surface of the second side rail.

* * * * *